(12) United States Patent
Okano et al.

(10) Patent No.: US 6,301,416 B1
(45) Date of Patent: Oct. 9, 2001

(54) OPTICAL THREE-DIMENSIONAL IMAGING DEVICE WHICH USES AN INTEGRAL PHOTOGRAPHY TECHNIQUE

(75) Inventors: Fumio Okano; Haruo Hoshino; Jun Arai; Tomoyuki Mishina, all of Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 09/414,542

(22) Filed: Oct. 8, 1999

(30) Foreign Application Priority Data

Oct. 9, 1998 (JP) .................................................. 10-288407

(51) Int. Cl.$^7$ ...................................................... G02B 6/06
(52) U.S. Cl. .............................................................. 385/116
(58) Field of Search ........................... 385/115–119, 147; 357/109, 118, 127, 132

(56) References Cited

U.S. PATENT DOCUMENTS

| | | | |
|---|---|---|---|
| 4,675,535 | * 6/1987 | Tsunekawa et al. | 250/214.1 |
| 4,873,572 | * 10/1989 | Miyazaki et al. | 600/109 |
| 5,305,759 | * 4/1994 | Kaneko et al. | 600/476 |
| 5,436,655 | * 7/1995 | Hiyama et al. | 348/139 |
| 5,784,098 | * 7/1998 | Shoji et al. | 348/139 |
| 5,976,071 | * 11/1999 | Sekiya | 348/45 |
| 6,063,023 | * 5/2000 | Sakiiyama et al. | 600/117 |

* cited by examiner

*Primary Examiner*—Akm E. Ullah
(74) *Attorney, Agent, or Firm*—Sughrue, Mion, Zinn, Macpeak & Seas, PLLC (57) ABSTRACT

In a three-dimensional imaging device, plural optical fibers which are provided with a lens characteristic by a refractive index distribution which is not uniform in a radial direction, such as a square-law characteristic, and which has the same length are configured so that the length $\theta$ is an odd-number multiple of a half period of an optical path, and both ends of the optical fibers are arranged in the same two-dimensional manner. The configuration is used in a plural number so that a three-dimensional object is three-dimensionally imaged and the image is transmitted.

7 Claims, 7 Drawing Sheets

OPTICAL THREE-DIMENSIONAL IMAGING DEVICE WHICH USES AN INTEGRAL PHOTOGRAPHY TECHNIQUE

BACKGROUND OF THE INVENTION

1. Field of the Invention

The present invention relates to a three-dimensional imaging device which optically transmits a three-dimensional image, and more particularly to an optical three-dimensional imaging device which uses the so-called integral photography (IP) technique.

The integral photography is one of three-dimensional image systems, and uses a microlens similar to a compound eye of an insect.

2. Description of the Related Art

An optical three-dimensional imaging device which uses the integral photography technique is disclosed in Japanese Patent Application No. HEI10-117355. In the disclosed apparatus, as shown in FIG. 1, plural optical fibers (grated index optical fibers) 10 acting as a lens and having the same length are configured so that the optical fibers have a length which is an integer multiple of one period of the optical path and both the ends are placed in the same two-dimensional arrangement (hereinafter, referred to as "optical fiber group"), whereby a three-dimensional model (object) 11 is three-dimensionally imaged, transmitted, and displayed.

According to the invention of the previous application, a three-dimensional image can be transmitted for a long distance without increasing the scale of an optical transmission path, and changing light into an electric signal. When the optical fibers are produced so as to be bendable, the transmission path can be bent. An expansion device, a reduction device, or a light intensifying device may be inserted into a specific place in a middle of the optical fibers, so that the three-dimensional image can be expanded, reduced, or optically intensified. Therefore, the apparatus of the previous application can be used in, for example, an endoscope or a borescope which provides a three-dimensional image.

Figure 1:
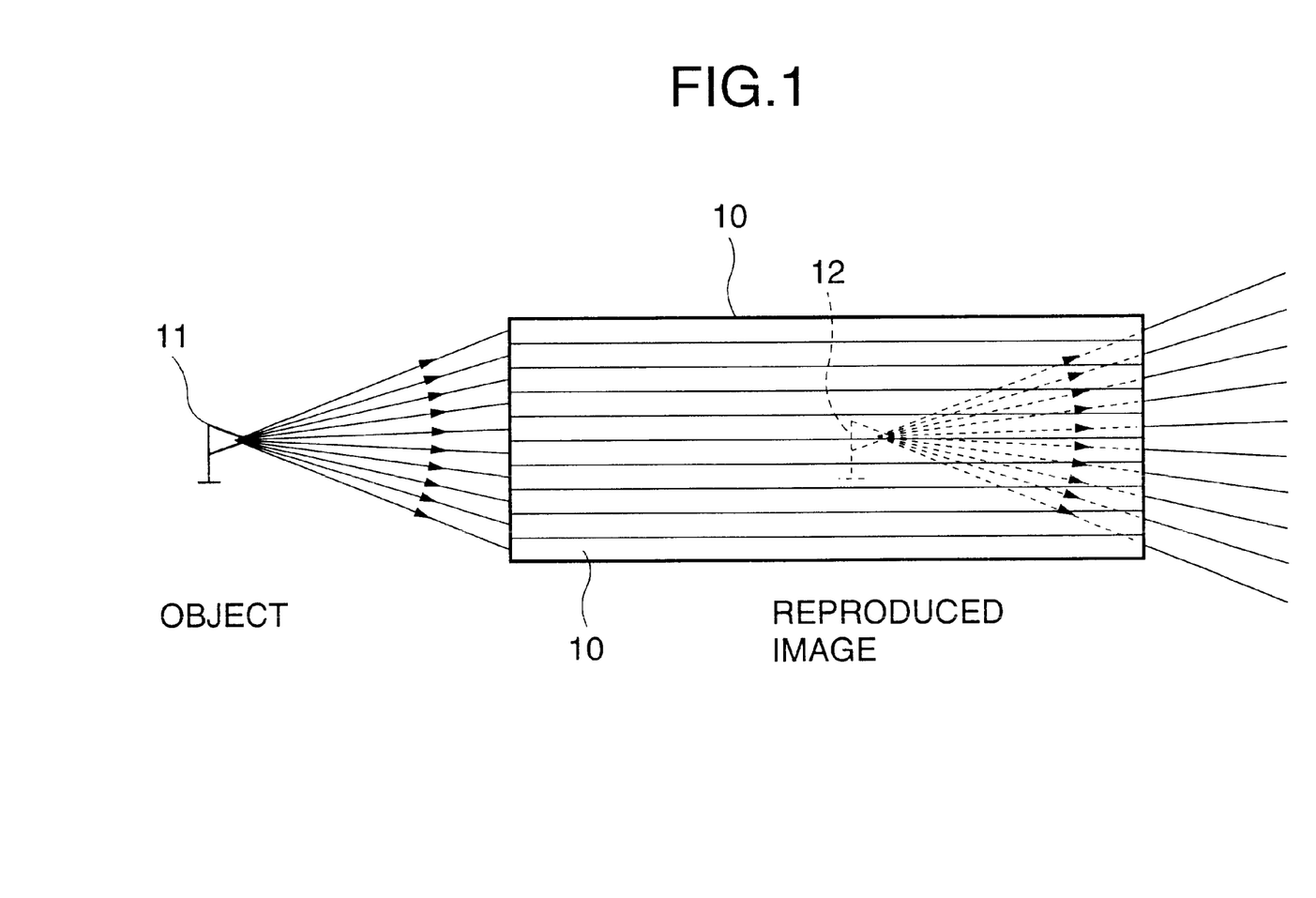
FIG. 1 is an optical path diagram showing the manner of reproducing a three-dimensional image.

However, the invention of Japanese Patent Application No. HEI10-117355 which is previously filed has a problem to be solved in that, as shown in FIG. 1, a reproduced three-dimensional image 12 is produced only behind end faces of the optical fibers 10 (i.e., in the optical fiber group) and cannot be displayed as an aerial image on the front faces of the optical fibers.

SUMMARY OF THE INVENTION

It is an object of the invention to provide a three-dimensional imaging device which can solve the problem and display a three-dimensional image as an aerial image on the front faces of optical fibers.

In order to achieve the object, the invention is characterized in that, in a three-dimensional imaging device in which plural optical fibers acting as a lens and having a same length are formed into an optical fiber group where both ends of the optical fibers are arranged in a same two-dimensional manner, whereby a three-dimensional object is three-dimensionally imaged and the image is transmitted and displayed, each of the optical fibers has a length which is an odd-number multiple of a half period of an optical path of the optical fiber.

Preferably, as the optical fibers, used are optical fibers having a refractive index distribution which is not uniform in a radial direction or a square-law characteristic.

Preferably, a three-dimensional object is three-dimensionally imaged and the image is transmitted and displayed while an even number of the optical fiber groups are used, and the optical fiber groups are arranged in series with being separated by a predetermined distance.

Preferably, a reduction optical system, an expansion optical system, or a rotational optical system is inserted into a plane of the optical fibers in which, when parallel rays are incident on the optical fibers of the optical fiber group, an image is formed.

Preferably, a light intensifier is inserted into a plane of the optical fibers in which, when parallel rays are incident on the optical fibers of the optical fiber group, an image is formed.

According to the invention, plural optical fibers acting as a lens, having a same length, and having a refractive index distribution which is not uniform in a radial direction, such as a square-law characteristic are set so that each of the optical fibers has a length which is an odd-number multiple of a half period of the optical path of the optical fiber, and plural optical fiber groups where both ends of the optical fibers are arranged in the same two-dimensional manner are used. Therefore, a three-dimensional image can be displayed as an aerial image on the front faces of the optical fibers.

DETAILED DESCRIPTION OF THE PREFERRED EMBODIMENT

Hereinafter, embodiments of the invention will be described in detail with reference to the accompanying drawings.

As an example of an optical fiber in which the refractive index is higher at the center in a radial direction and gradually lowered as moving toward the periphery, used is an optical fiber 10 having the following properties:

[Equation 1] (1)

$$n = n_0 \cdot \left(1 - \frac{A}{2}r^2\right)$$

where
- n: refractive index at a radius r
- $n_0$: refractive index at the center
- A: constant
- r: radius.

Figure 2:
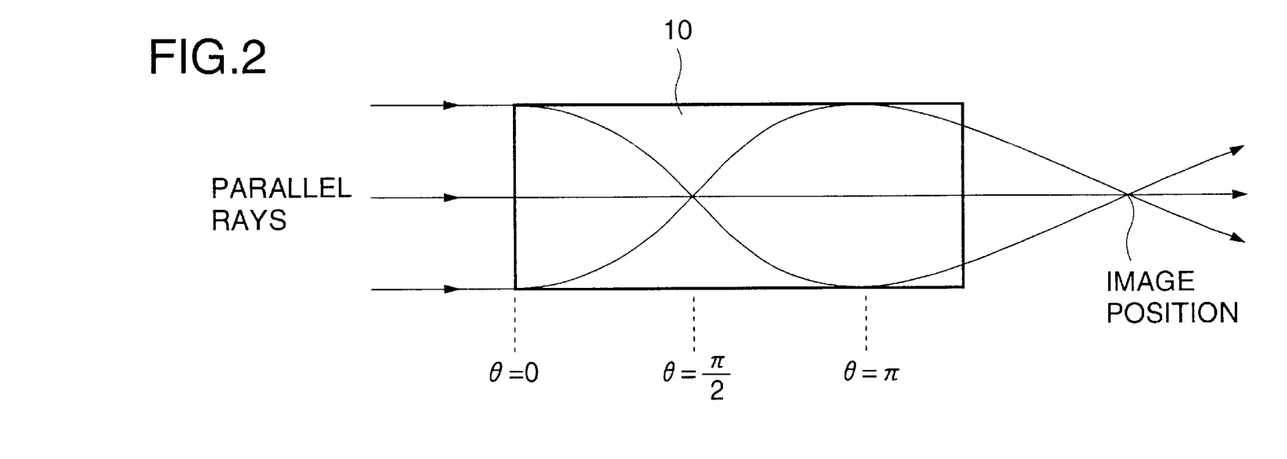
FIG. 2 is an optical path diagram showing the operation principle of an optical fiber.

When light is incident on the optical fiber 10, light rays propagate in a meandering manner as shown in FIG. 2, and are then focused at a specific point because the refractive index is higher as moving toward the center (axial center) in a radial direction. Namely, the optical fiber acts as a lens. This principle was found in 1964 by D. MARCUSE et al., and is described in detail in The Bell System Technical Journal (July, 1964), etc. A ray matrix of the optical fiber, i.e., relationships among the position and the angle of the incident light, and those of the emission light are represented by following Equation (2):

[Equation 2] (2)

$$\begin{bmatrix} r_1 \\ r'_1 \end{bmatrix} = \begin{bmatrix} \cos\theta & \frac{1}{n_0\sqrt{A}}\sin\theta \\ -\frac{1}{n_0\sqrt{A}}\sin\theta & \cos\theta \end{bmatrix} \begin{bmatrix} r_2 \\ r'_2 \end{bmatrix}$$

where
- $r_1$: incident position of rays in the incident end face
- $r'_1$: inclination of rays in the incident end face
- $r_2$: emission position of rays in the emission end face
- $r'_2$: inclination of rays in the emission end face $\theta = \sqrt{A}Z_0$ $Z_0$: length of the optical fiber.

Figure 3:
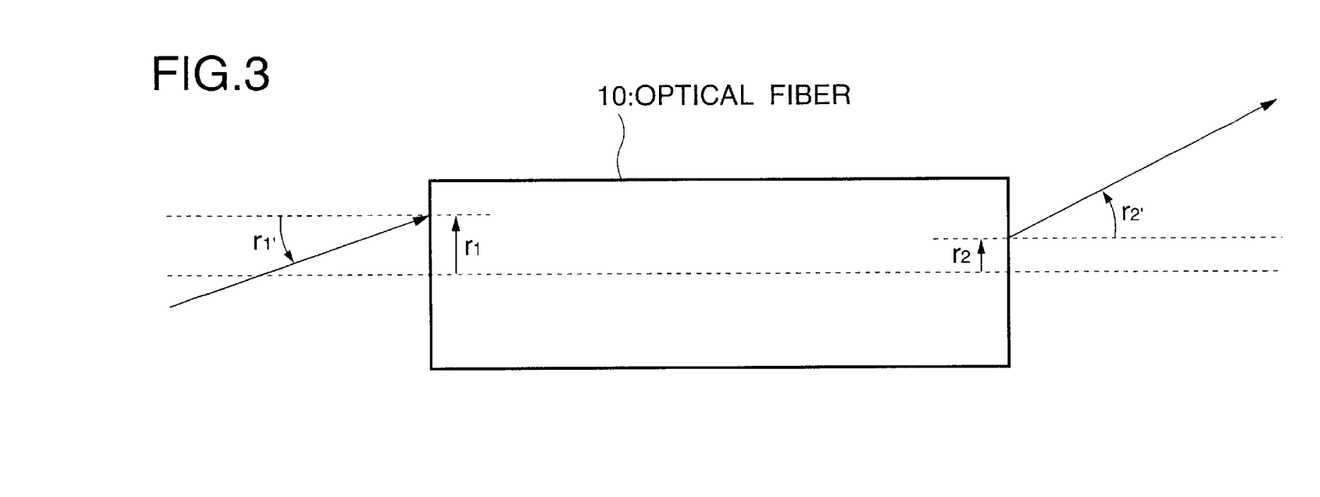
FIG. 3 is an optical path diagram showing incident rays and emission rays in an optical fiber.

The relationships are shown in FIG. 3.

In the three-dimensional imaging device of Japanese Patent Application No. HEI10-117355 which was invented by the inventors of the present invention, the image section and the displaying section are connected and integrated with each other, and the length $Z_0$ of the optical fiber 10 is set to

[Equation 4] (3)

$$Z_0 = \frac{\theta}{\sqrt{A}} = \frac{1}{\sqrt{A}}2(m+1)\pi$$

where
- m: integer of 0 or more.

Figure 4A:
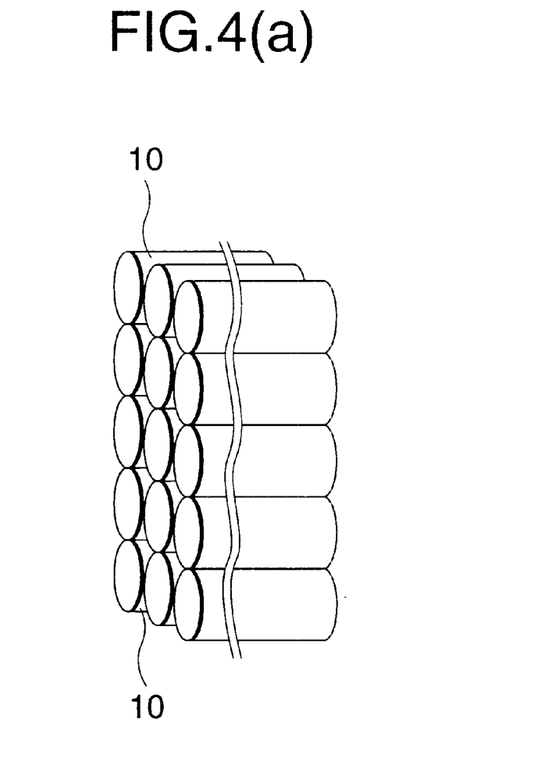
FIGS. 4(a) & 4(b) are a diagram showing optical fiber groups in which optical fibers serving as basic units are two-dimensionally arranged.
Figure 4B:
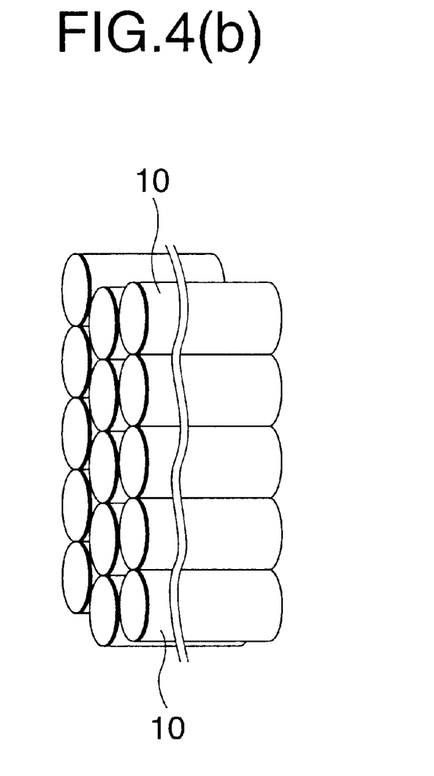

As shown in FIG. 4, such optical fibers 10 are two-dimensionally arranged to constitute an optical fiber group (optical fiber bundle), so that a three-dimensional image can be directly observed on the emission end face of the optical fiber group.

In Equation (3) above, the length corresponding to $\theta=2\pi$ corresponds to one period of the optical path of an optical fiber.

Figure 5:
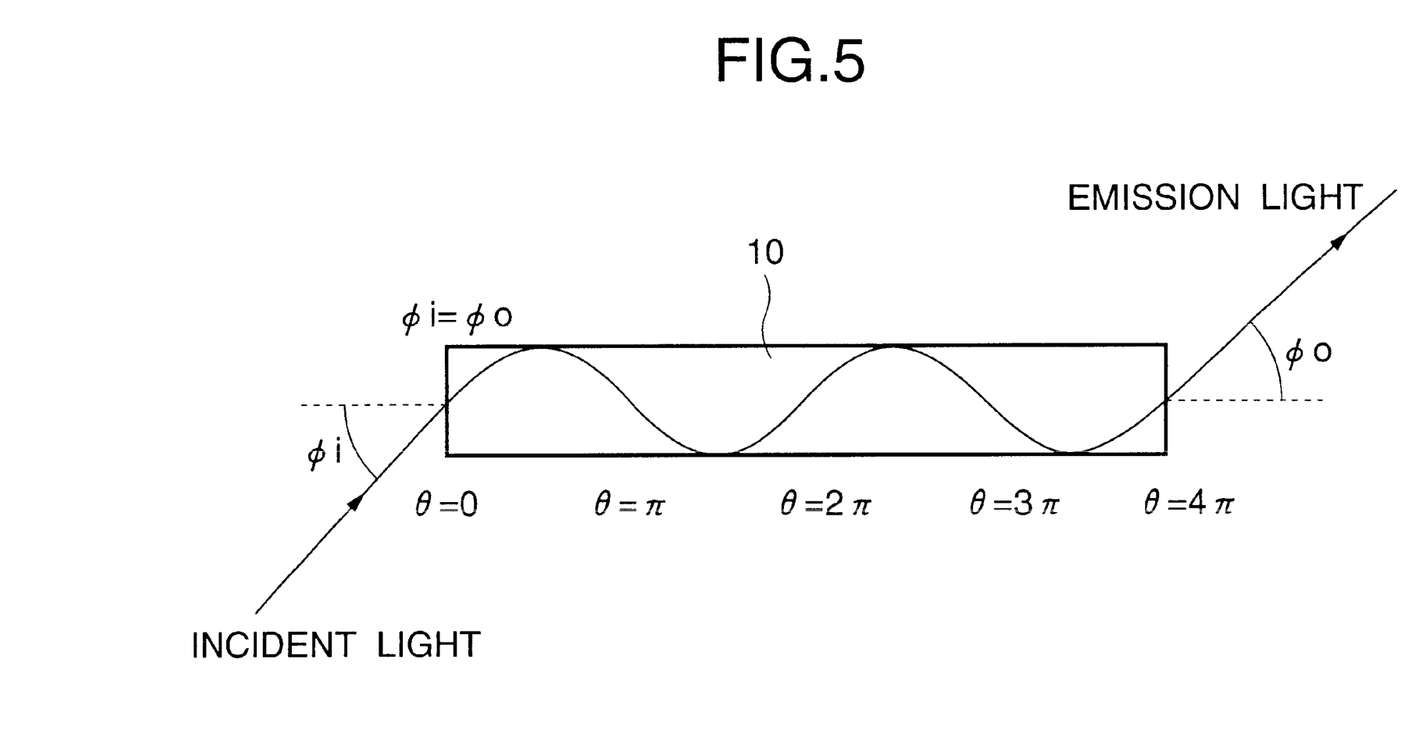
FIG. 5 is an optical path diagram showing an example ($\theta=4\pi$) of the length of an optical fiber.

When the length of an optical fiber satisfies Equation (3) above, the optical fiber has the property that, from Equation (2) above, $r_1=r_2$ and $r'_1=r'_2$ are attained and, as shown in FIG. 5, the angle $\phi_i$ of incident rays is equal to the angle $\phi_o$ of emission rays. When such optical fibers are two-dimensionally arranged as shown in FIG. 4, the directions of rays from the object on the incident end face are reproduced on the emission end face.

As shown in FIG. 1, therefore, a reproduced image of the same size as the object is obtained on the side of the emission end face and at the same distance as that between the incident end and the object. Under this state, as described above, the reproduced three-dimensional image is produced only behind the end faces of the optical fibers 10 and cannot be displayed as an aerial image on the front faces of the optical fibers.

Figure 6:
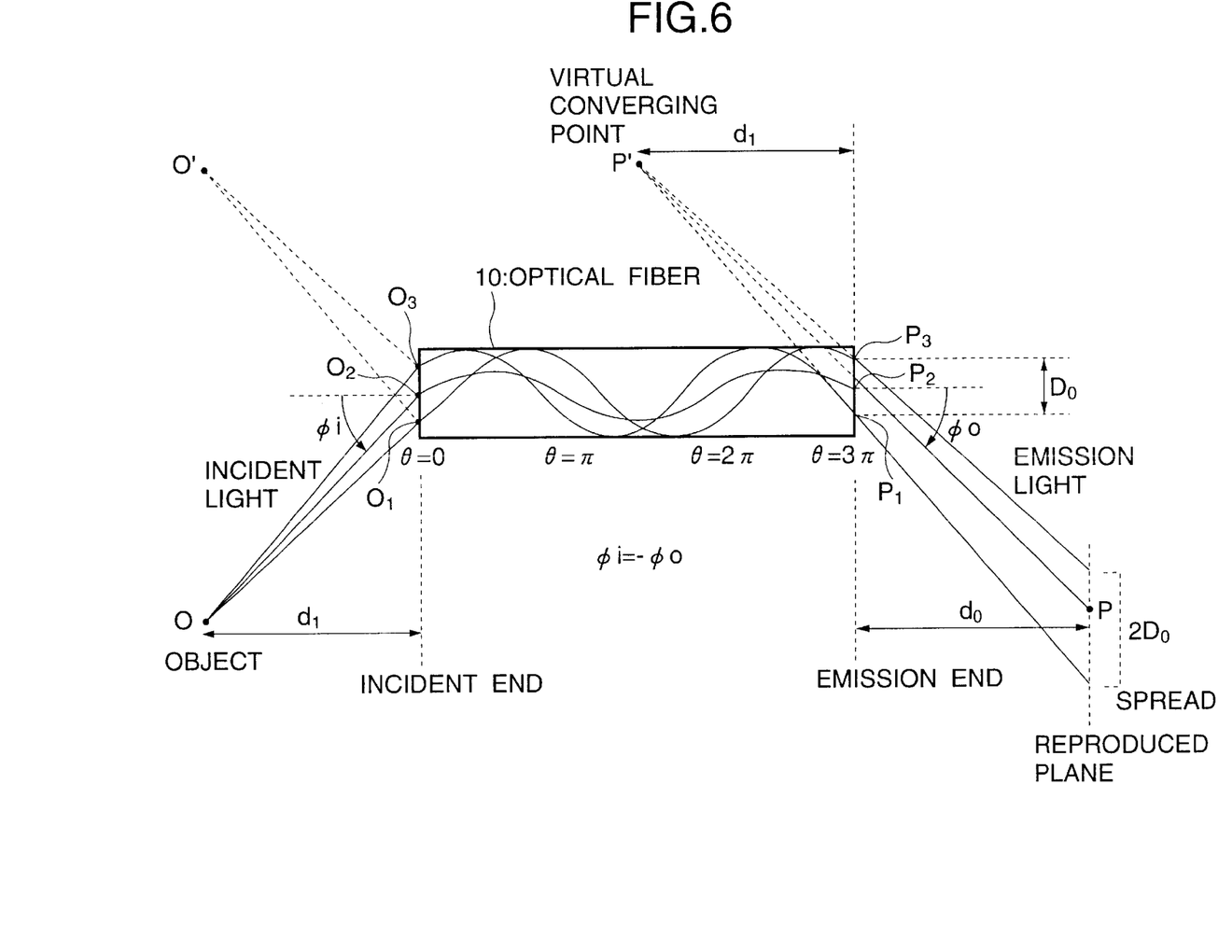
FIG. 6 is an optical path diagram showing relationships between incident light and emission light in a three-dimensional imaging device which is an embodiment of the present invention.

By contrast, when the length $Z_0$ of the optical fiber 10 is set to

[Equation 5] (4)

$$Z_0 = \frac{\theta}{\sqrt{A}} = \frac{1}{\sqrt{A}}(2m+1)\pi$$

where
- m: integer of 0 or more, as shown in FIG. 6, $r_1=-r_2$ and $r'_1=-r'_2$ are attained, and the angle $\phi_i$ of the incident rays and the angle $\phi_o$ of the emission rays are opposite in sign to each other and have the same absolute value.

Figure 7:
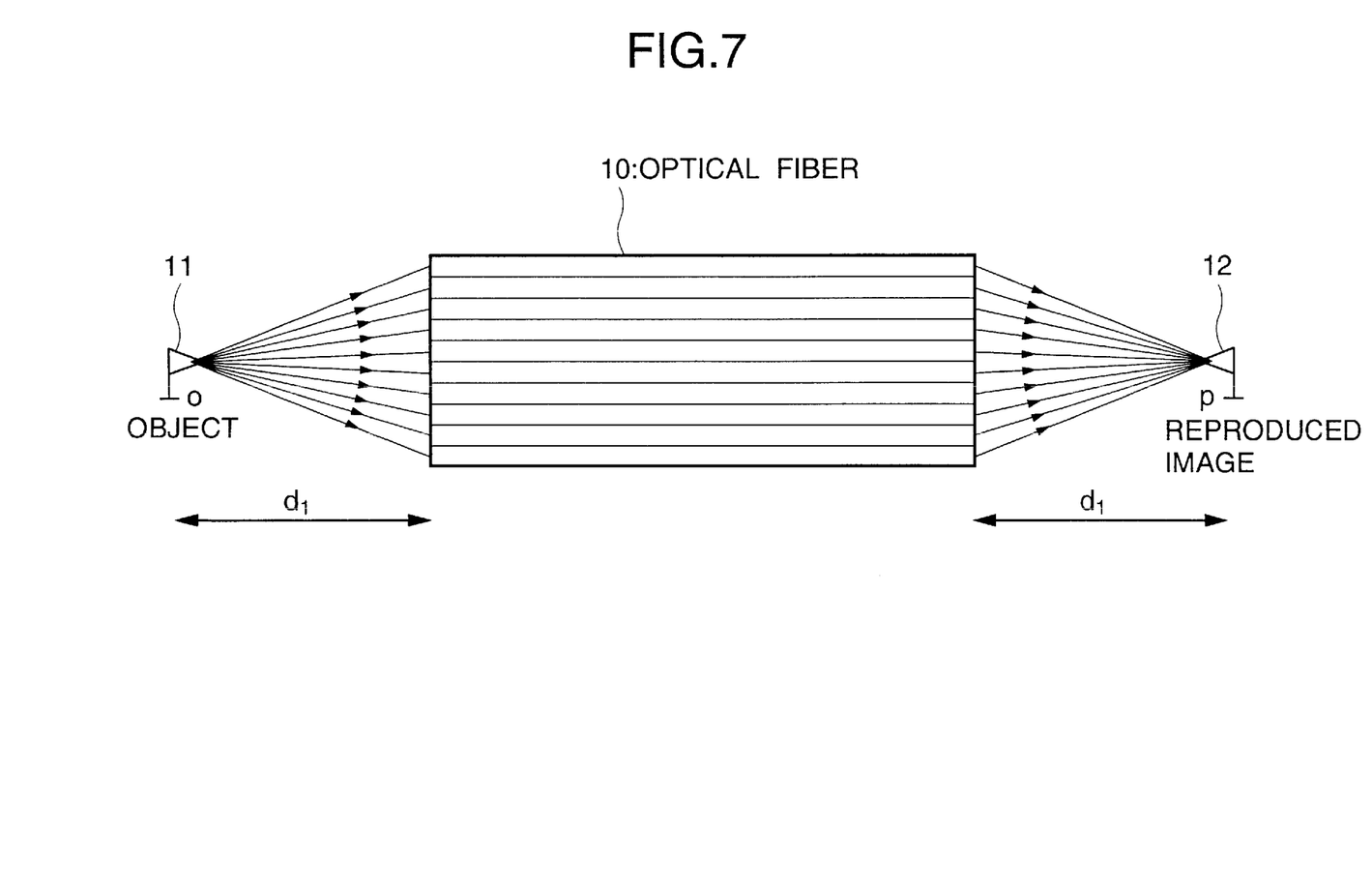
FIG. 7 is an optical path diagram showing relationships between an object and a reproduced image in one optical fiber group in a three-dimensional imaging device which is an embodiment of the invention.

Therefore, rays which are emitted from the center of the end face of each of the optical fibers 10 will be considered. As shown in FIG. 7, the rays have a shape which is obtained by symmetrically folding back the incident rays about the incident end face, and intersect at a position which is outside the optical fibers 10 and separated in the propagation direction of light from the emission end by the same distance as the distance $d_1$ between the incident end and the object 11. Namely, a reproduced image 12 is formed at the intersection P.

In this case, unlike the conditions of Equation (3) above, light emitted from the end faces of the optical fibers 10 propagate with a spread of a certain degree on the side of the emission end as if light is output from a virtual converging point P' as shown in FIG. 6. From the above, it will be seen that a triangle $OO_1O_3$ on the incident end side is indirectly congruent with a triangle $P'P_3P_1$ on the emission end side, i.e., a triangle $O'O_1O_3$ which is axially symmetrical to the triangle $OO_1O_3$ on the incident end side is congruent with the triangle $P'P_1P_3$ on the emission end side. When the reproduced image is seen from the virtual converging point P', therefore, the position P of the reproduced image is separated from the virtual converging point P' by a distance $2d_1$ which is twice the distance between the virtual converging point P' and the emission end of the optical fibers 10. On the reproduction plane, consequently, the reproduced image has a spread of $2D_0$ which is twice the spread $D_0$ of the flux emitted from the emission end face of one optical fiber, and hence results in an image which is blurred by a degree corresponding to the blurring. In the case of a small end face, however, the blurring does not produce a problem.

Under this state, finally, the reproduced image 12 of the same size as that of the object 11 is obtained. However, the reproduced image is seen in the direction opposite to that in which the object is seen, and hence the convex-concave relationships of the reproduced image are inverted. Namely, an image (reproduced image) having the same size and the inverted convex-concave relationships can be obtained outside the emission end faces of the optical fibers 10 and at a position which is separated from the emission end face by the same distance as the distance between the incident end face and the object.

Figure 8:
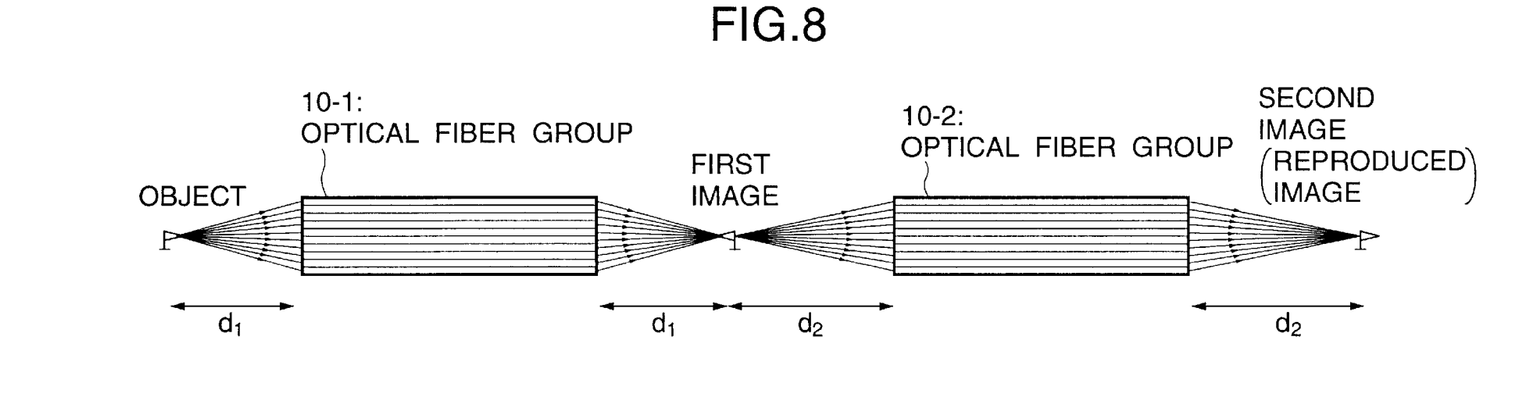
FIG. 8 is an optical path diagram showing relationships between an object and a reproduced image in two optical fiber groups in a three-dimensional imaging device which is an embodiment of the invention.

The invention is characterized in that, since the convex-concave relationships are inverted under this state, two or more sets of such optical fiber groups are used in series and with forming certain intervals, thereby eliminating the inverted convex-concave relationships. When the certain intervals are set so that the image (first image) formed by a first optical fiber group 10-1 is located in front of the incident end face of a second optical fiber group 10-2 (that is, $d_2$ in FIG. 8 is not negative), the image (second image) formed by the second optical fiber group is displayed as an aerial image outside the optical fiber end and has the correct convex-concave relationships. In other words, the inversion of the convex-concave relationships occurs two times in the configuration of FIG. 8, and, as a result, an image having the correct convex-concave relationships is formed. Since the first and second optical fiber groups 10-1 and 10-2 form an aerial image, the reproduced image (second image) is displayed as an aerial image.

Figure 9:
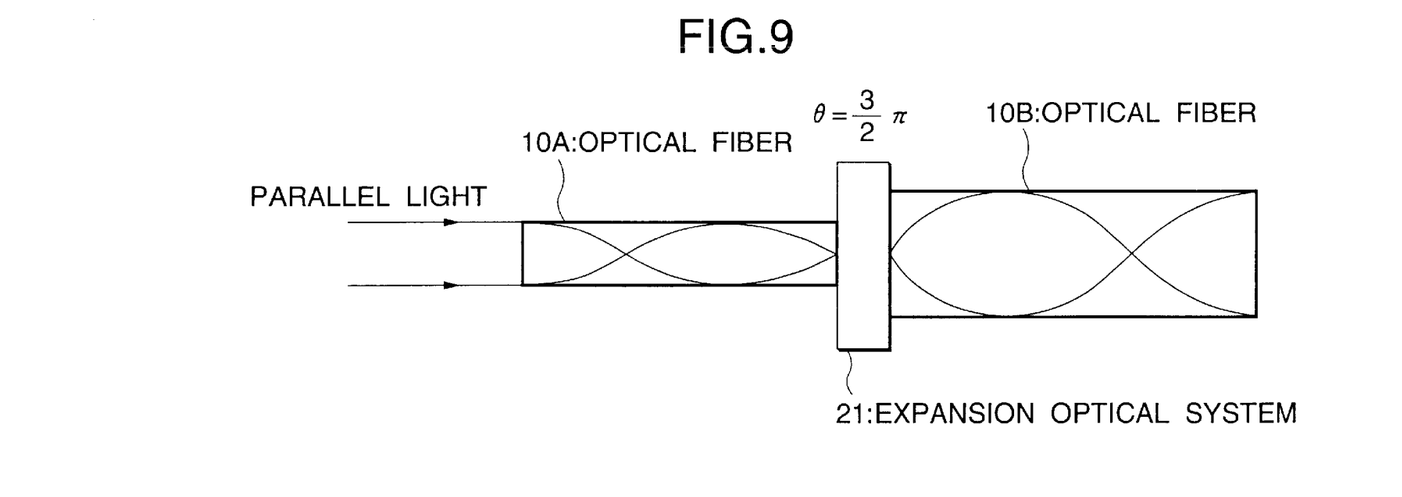
FIG. 9 is a configuration diagram showing expansion of a reproduced three-dimensional image in a three-dimensional imaging device which is an embodiment of the invention.

As shown, for example, in FIG. 9, the size of a reproduced three-dimensional image can be magnified with respect to that of the object by inserting an expansion optical system 21 into a plane of an optical fiber 10A in which an image is formed when parallel rays are incident on a face of the optical fiber and satisfying the following conditions, i.e., the optical fiber 10A on the incident side:

[Equation 6]

$$0 = \sqrt{\sqrt{A}} Z_0 = (m + \tfrac{1}{2})\pi$$

where m: integer of 0 or more.

When the expansion optical system is replaced with a reduction optical system, the size of a reproduced three-dimensional image can be reduced.

As such an expansion or reduction optical system, a fiber optic plate (produced by Hamamatsu Photonics K.K.) or the like may be used. In this case also, the whole length of optical fibers of the optical system must satisfy Equation (4) above.

When a fiber optical system (produced by INCOM, Inc. of U.S.A.) which is similar to the fiber optic plate and can be rotated is inserted in place of the optical system 21 and at the same position, a three-dimensional image can be rotated.

When a light intensifier such as an image intensifier is inserted at the same position, the brightness of a displayed image can be intensified, and the bright reduction due to the transmission loss can be compensated.

(Other Embodiments)

It is a matter of course that, when the optical fiber groups are produced so as to be bendable in the same manner as the invention described in Japanese Patent Application No. HEI10-117355 which was invented by the inventors of the present invention, the transmission path in the invention can be bent. An optical fiber itself is flexible. For example, when fixing devices for fastening only both the ends of an optical fiber group may be disposed or an adhesive agent is applied to the ends, therefore, the state where the outer side of the optical fiber group is freely bendable can be held. An optical fiber group may be covered with, for example, a shape memory alloy, a shape memory resin, a wire of lead or copper, a tube of rubber or soft plastic, or the like.

As described above, according to the invention, in a three-dimensional imaging device in which plural optical fibers acting as a lens and having a same length are formed into an optical fiber group where both ends of the optical fibers are arranged in a same two-dimensional manner, whereby a three-dimensional object is three-dimensionally imaged and the image is transmitted and displayed, each of the optical fibers has a length which is an odd-number multiple of a half period of an optical path of the optical fiber. Therefore, a three-dimensional image can be transmitted for a long distance without changing light into an electric signal. The obtained three-dimensional image is displayed as an aerial image located outside the end faces of the optical fibers.

According to the invention, when two sets of such optical fiber groups are used in series with forming a certain interval, it is possible to eliminate inversion of the convex-concave relationships.

According to the invention, when an optical device for reduction, expansion, or rotation is inserted into a specific place in the midway of the optical fibers, a three-dimensional image can be expanded, reduced, or rotated. When a light intensifier is further inserted, the brightness of a displayed image can be intensified, and the bright reduction due to the transmission loss can be compensated.

Furthermore, the transmission path in the invention may be bent.

Therefore, the three-dimensional imaging device of the invention can be used in, for example, an endoscope or a borescope which provides a three-dimensional image.

What is claimed is:

1. A three-dimensional imaging device in which plural optical fibers having a same length are formed into an optical fiber bundle where said plural optical fibers at both ends of said optical fiber bundle are arranged in a same two-dimensional manner, each of said optical fibers having a length which is an odd-number multiple of a half period of an optical path of said optical fibers, whereby a three-dimensional object is three-dimensionally imaged and the image is transmitted through said optical fiber bundle so that said three-dimensional image is displayed in front of the emission end face of said optical fiber bundle.

2. A three-dimensional imaging device according to claim 1, wherein, as said optical fibers, used are optical fibers having a refractive index distribution which is not uniform in a radial direction or a square-law characteristic.

3. A three-dimensional imaging device according to claim 1 or 2, wherein said three-dimensional object is imaged and said image is transmitted while an even number of said optical fiber bundles are used, and said optical fiber bundles are arranged in series while being separated by a predetermined distance.

4. A three-dimensional imaging device according to claim 1 or 2, wherein a reduction optical system, an expansion optical system, or a rotational optical system is inserted into a plane of said optical fibers in which, when parallel rays are incident on said optical fibers of said optical fiber bundle, said image is focused.

5. A three-dimensional imaging device according to claim 1 or 2, wherein a light intensifier is inserted into a plane of said optical fibers in which, when parallel rays are incident on said optical fibers of said optical fiber bundle, said image is focused.

6. A three-dimensional imaging device according to claim 3, wherein a reduction optical system, an expansion optical system, or a rotational optical system is inserted into a plane of said optical fibers in which, when parallel rays are incident on said optical fibers of said optical fiber bundle, said image is focused.

7. A three-dimensional imaging device according to claim 3, wherein a light intensifier is inserted into a plane of said optical fibers in which, when parallel rays are incident on said optical fibers of said optical fiber bundle, said image is focused.

* * * * *